United States Patent
Shi et al.

(10) Patent No.: US 8,732,298 B2
(45) Date of Patent: May 20, 2014

(54) METHOD AND APPARATUS FOR MAINTAINING ROUTING INFORMATION

(75) Inventors: Guangyu Shi, Shenzhen (CN); Jian Chen, Shenzhen (CN); Hao Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 12/834,239

(22) Filed: Jul. 12, 2010

(65) Prior Publication Data

US 2010/0281163 A1 Nov. 4, 2010

Related U.S. Application Data

(63) Continuation of application No. PCT/CN2009/070328, filed on Feb. 1, 2009.

(30) Foreign Application Priority Data

Feb. 5, 2008 (CN) .......................... 2008 1 0065364

(51) Int. Cl.
*G06F 15/173* (2006.01)
*G06F 15/16* (2006.01)

(52) U.S. Cl.
USPC .......................... 709/224; 709/242; 709/243

(58) Field of Classification Search
CPC .......... H04l 45/00; H04l 45/04; H04l 67/104; H04l 67/1093; H04l 67/1051
USPC ......................... 709/224, 242, 243
See application file for complete search history.

(56) References Cited

U.S. PATENT DOCUMENTS 6,980,537 B1 * 12/2005 Liu ............................... 370/338
7,673,143 B1 * 3/2010 Yeager et al. ................. 713/175
(Continued)

FOREIGN PATENT DOCUMENTS

| CA | 2611146 | 12/2006 |
| CN | 1845524 | 10/2006 |

(Continued)

OTHER PUBLICATIONS

Written Opinion of the International Searching Authority, mailed May 7, 2009, in corresponding International Application No. PCT/CN2009/070328 (8 pp.).

(Continued)

*Primary Examiner* — Quang N Nguyen
*Assistant Examiner* — David X Yi
(74) *Attorney, Agent, or Firm* — Staas & Halsey LLP

(57) ABSTRACT

A method and apparatus for maintaining routing information in a Peer-to-Peer (P2P) network are provided. The method includes that: a super maintenance node receives routing update information of an ordinary node in its home area; the super maintenance node sends routing update information to super maintenance nodes in other network areas; the super maintenance nodes in other network areas notify ordinary nodes in their home network areas to update routing information. With the present invention, a node of strong processing capabilities at the network area border is chosen to act as a super maintenance node and other nodes as ordinary nodes; when a node joins or fails, an ordinary node sends detected routing update information only to the super maintenance node in the local network area; the super maintenance node then forwards the update information to super maintenance nodes in other network areas. Each super maintenance node notifies ordinary nodes in its home network area of the received routing update information.

14 Claims, 7 Drawing Sheets

```
┌─────────────────────────────────────────┐
│ Know that all super maintenance peers   │
│ in a second network area have failed,   │ ─── 301
│ calculate a range of peer IDs of the    │
│ second network area and generate        │
│ routing update information             │
└─────────────────────────────────────────┘
                    │
                    ▼
┌─────────────────────────────────────────┐
│ Send the routing update information to  │ ─── 302
│ ordinary peers in the home network area │
└─────────────────────────────────────────┘
```

(56) References Cited

U.S. PATENT DOCUMENTS

| | | | |
|---|---|---|---|
| 7,720,978 B2 * | 5/2010 | Zhu et al. | 709/228 |
| 2004/0246905 A1 | 12/2004 | Dunagan et al. | |
| 2005/0198328 A1 | 9/2005 | Lee et al. | |
| 2006/0171332 A1 | 8/2006 | Barnum | |
| 2007/0050497 A1 | 3/2007 | Haley et al. | |
| 2009/0119406 A1 | 5/2009 | Zhu et al. | |

FOREIGN PATENT DOCUMENTS

| | | |
|---|---|---|
| CN | 1852381 | 10/2006 |
| CN | 1878118 A | 12/2006 |
| CN | 1939003 A | 3/2007 |
| CN | 101064649 | 10/2007 |
| CN | 101079783 A | 11/2007 |
| CN | 101316224 | 12/2008 |
| CN | 101505263 B | 10/2011 |
| CN | 102123100 B | 6/2013 |
| EP | 1657939 | 5/2006 |
| WO | WO 01/82678 A2 | 11/2001 |
| WO | WO 2006/000467 | 1/2006 |
| WO | 2006/083495 A2 | 8/2006 |
| WO | WO 2008/003258 | 1/2008 |

OTHER PUBLICATIONS

Extended European Search Report, mailed Dec. 3, 2010, in corresponding European Application No. 09710044.0 (9 pp.).

International Search Report, mailed May 7, 2009, in corresponding International Application No. PCT/CN2009/070328 (6 pp.).

Chinese Office Action mailed Mar. 21, 2012 issued in corresponding Chinese Patent Application No. 201110067524.9.

Qing Jiang Liu, "Design of Auto-Discover Hierarchical Storage Network Topology", ADHSNT, vol. 23, No. 6, 2007, pp. 1-3.

European Office Action mailed Jul. 10, 2013 in corresponding European Patent Application No. 09710044.0-1856 (6 pages).

European Search Report mailed Oct. 28, 2013 in corresponding European Patent Application No. 13182545.7-1856 (8 pages).

"*CBT: A proximity-aware peer clustering system in large-scale Bit-Torrent-like peer-to-peer networks*"; Science Direct: Computer Communications 31 (2008) 591-602; Jiadi Yu, Minglu Li; Department of Computer Science and Engineering, Shanghai Jiao Tong University, Shanghai 200030, P.R. China; pp. 592-602.

* cited by examiner

METHOD AND APPARATUS FOR MAINTAINING ROUTING INFORMATION

CROSS-REFERENCE TO RELATED APPLICATIONS

This application is a continuation of International Application No. PCT/CN2009/070328, filed on Feb. 1, 2009, which claims priority to Chinese Patent Application No. 200810065364.2, filed on Feb. 5, 2008, both of which is hereby incorporated by reference in their entireties.

FIELD OF THE INVENTION

The present invention relates to the field of Peer-to-Peer (P2P) technologies, and in particular, to a method and an apparatus for maintaining routing information.

BACKGROUND OF THE INVENTION

A P2P network is a self-organized network system that nodes join or leave at random. Therefore, when a node joins or leaves the system, the system must update the routing information maintained by every node so that the routing is restored and that queries are reliable.

During the implementation of the present invention, the inventor discovers at least the following weakness in the prior arts:

The prior arts are generally based on a broadcast mechanism. When a node joins the P2P system or fails, the system sends a broadcast message to notify all nodes in the network to update routing information. This mechanism is simple but has an obvious weakness: a large bandwidth is required, and when a certain number of nodes fail simultaneously, a network storm is likely to occur, which will result in a system crash.

SUMMARY OF THE INVENTION

Embodiments of the present invention provide a method and apparatus for maintaining routing information so as to reduce the overhead incurred in the process of route maintenance.

A method for choosing nodes includes:

obtaining a routing path between nodes in a system and delay information between routers that data packets pass through;

grouping the nodes into at least one cluster by means of bipartite clustering according to the path information between nodes and delay information between routers; and choosing one or more nodes as super maintenance nodes from the cluster of nodes.

An apparatus for choosing nodes includes:

a probing unit, configured to obtain a routing path between nodes in a system and delay information between routers that data packets pass through;

a computing unit, configured to group the nodes into at least one cluster by means of bipartite clustering according to the path information between nodes and delay information between routers obtained by the probing unit; and a choosing unit, configured to choose one or multiple nodes as super maintenance nodes from the cluster of nodes grouped by the computing unit.

A method for maintaining routing information includes:

receiving, by a super maintenance node, routing update information of an ordinary node in its home area;

sending, by the super maintenance node, the routing update information to super maintenance nodes in other network areas; and notifying, by the super maintenance node, ordinary nodes in its home area to update routing information.

A method for maintaining routing information includes:

by a super maintenance node in a first network area, calculating a range of node IDs in a second network area according to a method for constructing a node ID that carries geographic location information and generating routing update information when the super maintenance node knows that all super maintenance nodes in the second network area have failed, where the routing update information includes the range of IDs of failed nodes; and notifying, by the super maintenance node in the first network area, ordinary nodes in its home area to update routing information.

A super maintenance node includes:

a message receiving unit, configured to receive routing update information; and a message sending unit, configured to send the routing update information to ordinary nodes in its home network area and super maintenance nodes in other network areas according to the routing update information received by the message receiving unit.

A system for maintaining routing information includes a first ordinary node, a first super maintenance node, a second ordinary node, a third super maintenance node, a fourth ordinary node, a fourth super maintenance node and a fifth ordinary node, where:

the first ordinary node is configured to: generate routing update information and send the routing update information to the first super maintenance node;

the first super maintenance node is configured to: receive the routing update information from the first ordinary node and send routing update information to the third super maintenance node and the second ordinary node according to the routing update information;

the second ordinary node is configured to: receive the routing update information from the first super maintenance node and update routing information according to the received routing update information;

the third super maintenance node is configured to: receive the routing update information from the first super maintenance node and send routing update information to the fourth ordinary node and the fourth super maintenance node according to the routing update information;

the fourth ordinary node is configured to: receive the routing update information from the third super maintenance node and update routing information according to the received routing update information;

the fourth super maintenance node is configured to: receive the routing update information from the third super maintenance node and send routing update information to the fifth ordinary node according to the routing update information; and the fifth ordinary node is configured to: receive the routing update information from the fourth super maintenance node and update routing information according to the received routing update information.

Another system for maintaining routing information includes a first ordinary node, a first super maintenance node, a second ordinary node, a second super maintenance node, and a third ordinary node, where:

the first ordinary node is configured to: generate routing update information and send the routing update information to the first super maintenance node;

the first super maintenance node is configured to: receive the routing update information from the first ordinary node and send routing update information to the second super maintenance node and the second ordinary node according to the routing update information;

the second ordinary node is configured to: receive the routing update information from the first super maintenance node and update routing information according to the received routing update information;

the second super maintenance node is configured to: receive the routing update information from the first super maintenance node and send routing update information to the third ordinary node according to the routing update information; and the third ordinary node is configured to: receive the routing update information from the second super maintenance node and update routing information according to the received routing update information.

Compared with the prior arts, the method and apparatus for maintaining routing information in a P2P network in the embodiments of the present invention fully utilize nodes of strong processing capabilities at a network area border in the P2P system to enable such nodes to act as maintenance nodes, which are responsible for notifying ordinary nodes in their home network areas of received routing update information, and forwarding routing update information of their home network areas to super maintenance nodes in other network areas. In this way, routing update information of different network areas is only transferred between super maintenance nodes, and forwarded by super maintenance nodes to all nodes in the network, so as to significantly reduce the inter-area routing table maintenance overhead in the P2P network incurred by the change of nodes.

DETAILED DESCRIPTION OF THE EMBODIMENTS

Figure 1:
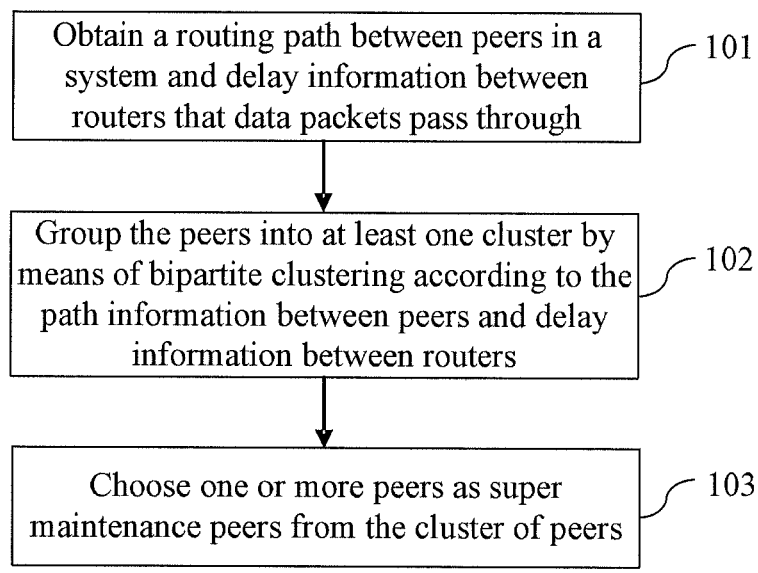
FIG. 1 is a flowchart of a method for choosing super maintenance nodes according to an embodiment of the present invention.

The technical solution of the embodiments of the present invention will be described in detail with reference to the accompanying drawings.

In the embodiments of the present invention, in view of the difference in processing capabilities of nodes in a P2P network, a node of strong processing capabilities located at the network edge is chosen to act as a super maintenance node, which is responsible for forwarding routing update messages from its local network area to other network areas. In this way, inter-area traffic of routing information is reduced while the routing table is updated in time.

According to one embodiment of the present invention, the system chooses a node of strong processing capabilities located at the network border as a super maintenance node and other nodes as ordinary nodes; according to geographic information of the nodes, nodes near to the super maintenance node are grouped into one network area; when a node joins or fails, an ordinary node sends a detected routing update message only to the super maintenance node of the local network area; the super maintenance node notifies all nodes in the local network area of the routing update message. In this way, routing update messages of different network areas are only transferred between super maintenance nodes, and then forwarded by super maintenance nodes to all nodes in the network, so as to significantly reduce the inter-area routing table maintenance overhead in the P2P network.

The super maintenance node referred to in the embodiment is a node of strong processing capabilities located at the border of a network area; the processing capabilities refer to the egress bandwidth or computing capability, or hard disk size, or memory size. For example, a node with a memory size larger than 4 GB is a super maintenance node.

Nodes maintained by the super maintenance node may be:
   ordinary nodes in the local geographic area of the super maintenance node;
   ordinary nodes that have a transmission delay shorter than K milliseconds with the super maintenance node, where the value of K may be set flexibly according to the number of ordinary nodes maintained by the super maintenance node, where generally, the larger the value of K is, the more ordinary nodes maintained by the super maintenance node will be;
   or nodes chosen randomly.

For example, nodes near to the super maintenance node are grouped into one network area according to geographic information of the nodes and the super maintenance node is responsible for updating routing information of all nodes in the network area.

The area to be maintained by the super maintenance node is defined according to geographic relations. For example, the super maintenance node and ordinary nodes within a province are grouped into one network area. Optionally, network areas are grouped according to the delay information between ordinary nodes and the super maintenance node. For example, ordinary nodes that have a transmission delay shorter than 20 ms with the super maintenance node are grouped into one network area.

There may be one or more super maintenance nodes in one network area.

FIG. 1 shows a method for choosing super maintenance nodes according to an embodiment of the present invention. The method includes the following steps:

Step 101: Obtain a routing path between nodes in a system and delay information between routers that data packets pass through.

Practically, the method may determine a certain number of destination nodes among multiple nodes chosen from the system, execute the TraceRoute command, and process the returned trace results to obtain routing information between the nodes and delay information between routers that packets pass through. The TraceRoute command is a tool provided by the computer operating system, configured to obtain a list of router addresses that a packet passes through before it arrives at the destination node and the time when the packet reaches each router.

The TraceRoute command may be executed by every node in the system by taking a number of other nodes as destination nodes so as to obtain the routing path between the nodes and the delay information between the routers in the path. For example, for every node in the system, two other nodes are chosen as the destination nodes, and the TraceRoute command is executed on every node. The chosen number of destination nodes is alterable as required, so long as the entire system is covered.

Alternatively, the TraceRoute command may be executed on some nodes of strong capabilities or some special computers or servers by taking all nodes in the system as destination nodes.

Figure 2:
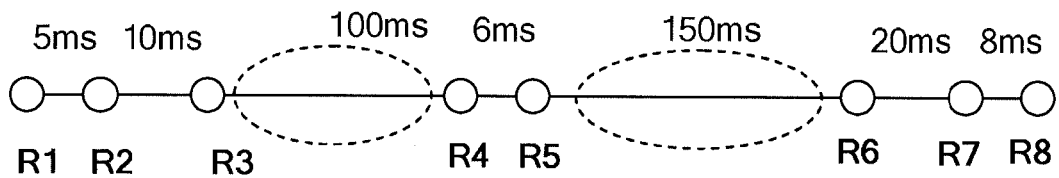
FIG. 2 illustrates a process in which super maintenance nodes are chosen automatically according to an embodiment of the present invention.

FIG. 2 illustrates how super maintenance nodes are chosen automatically according to an embodiment of the present invention. In FIG. 2, the TraceRoute command is executed to obtain the delay between router R1 and router R2 as 5 ms and the delay between R3 and R4 as 100 ms.

Step 102: Group the nodes into at least one cluster by means of bipartite clustering according to the path information between nodes and delay information between routers.

The node performs bipartite clustering according to the obtained path information and delay information between routers to obtain two sets of large delay and small delay. Addresses of all routers whose previous hop delay is small but the next hop delay is large along the path beginning with the node are regarded as identifiers of the home area of the node and such routers are called routers located at the network area border. The node registers these identifiers and information of the node itself into a Distributed Hash Table (DHT) or a certain data storage location. The system then clusters nodes that have the same area identifier. In this way, the multiple nodes in the system will be grouped into multiple clusters and each cluster makes up a network area.

For example, in FIG. 2, R3 is a first-level home area identifier of the node (comparable to "county") and therefore all nodes whose home area identifier is the address of R3 are grouped into one cluster; R5 is a second-level home area identifier of the node (comparable to "province") and therefore all nodes whose home area identifier is the address of R5 are grouped into one cluster.

Step 103: Choose one or more nodes, from the cluster of nodes, as super maintenance nodes.

According to the above method for choosing super maintenance nodes, an apparatus for choosing super maintenance nodes is provided in an embodiment of the present invention. The apparatus is implemented based on the above method and may be placed in a node, or a server, or any other telecommunication device.

Figure 3:
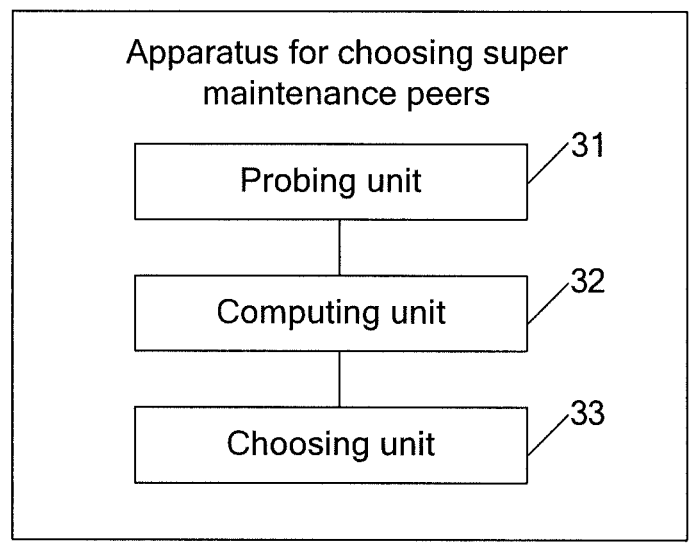
FIG. 3 illustrates an apparatus for automatically choosing super maintenance nodes according to an embodiment of the present invention.

FIG. 3 shows an apparatus for automatically choosing super maintenance nodes in an embodiment of the present invention. The apparatus includes:

a probing unit 31, configured to obtain a routing path between nodes in a system and delay information between routers that data packets pass through;

a computing unit 32, configured to group the nodes into at least one cluster by means of bipartite clustering according to the path information between nodes and delay information between routers obtained by the probing unit 31; and a choosing unit 33, configured to choose one or multiple nodes as super maintenance nodes from the cluster of nodes grouped by the computing unit 32.

The probing unit 31 includes:

a routing executing module, configured to choose nodes to execute a TraceRoute command; and an analyzing and processing module, configured to process the returned results to obtain routing information between nodes and delay information between routers in the path.

In addition, a higher level super maintenance node may be chosen to manage multiple super maintenance nodes so that a map of grades is created where a super maintenance node of a higher grade manages multiple super maintenance nodes of a lower grade.

Figure 4:
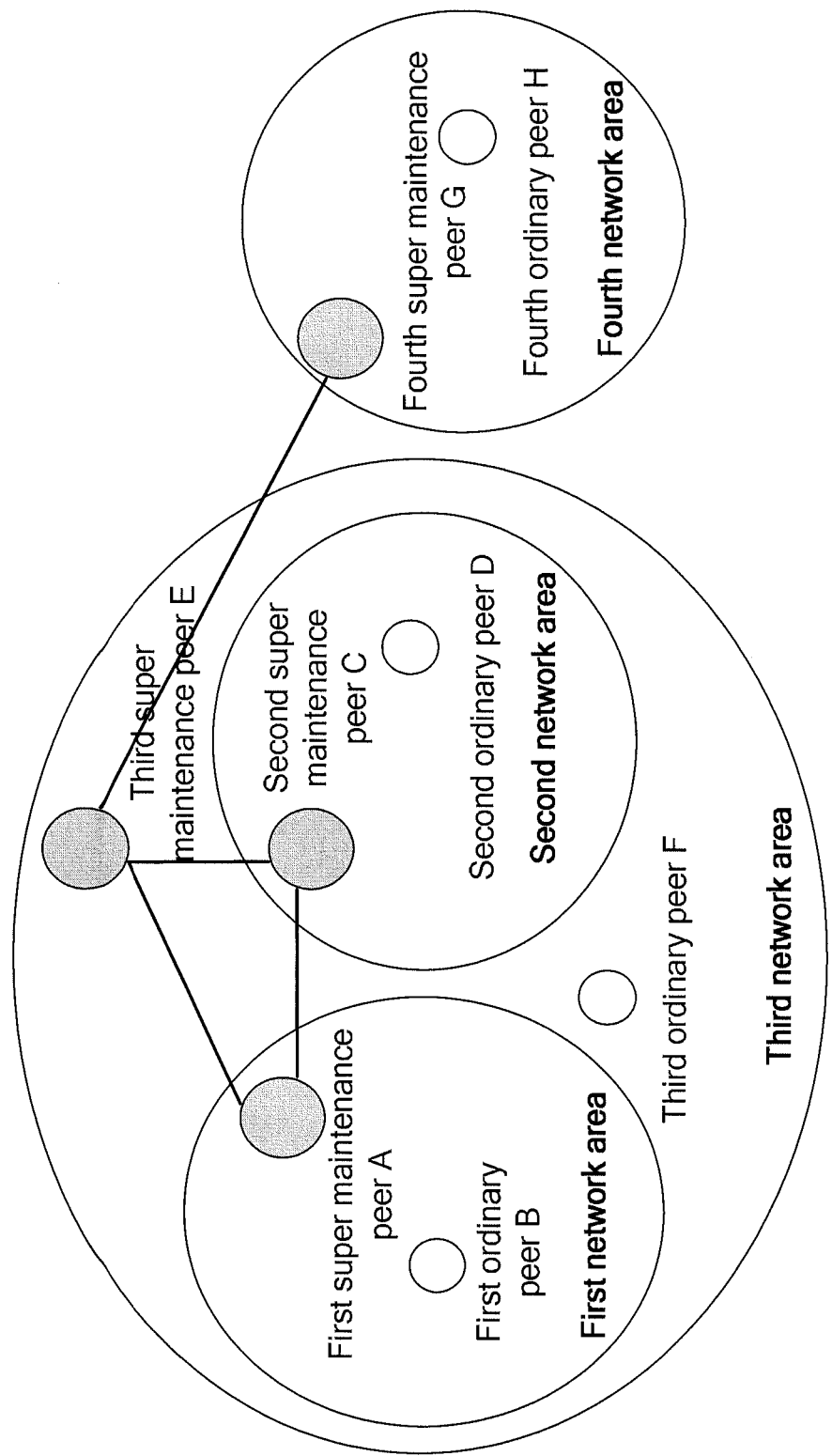
FIG. 4 illustrates a process in which a multilevel hierarchy of super maintenance nodes is constructed according to an embodiment of the present invention.

FIG. 4 illustrates how a multi-level hierarchy of super maintenance nodes is constructed. A first network area includes a first super maintenance node A and a first ordinary node B; a second network area includes a second super maintenance node C and a second ordinary node D; a third network area includes a third super maintenance node E and a third ordinary node F, and contains the first network area and the second network area; a fourth network area includes a fourth super maintenance node G and a fourth ordinary node H. The third super maintenance node E forms a tree-like hierarchy with the first super maintenance node A and the second super maintenance node C and telecommunication connections are set up between them; a telecommunication connection is set up between the third super maintenance node E and the fourth super maintenance node G.

According to an embodiment of the present invention, a method for maintaining routing information by super maintenance nodes includes the following steps.

Figure 5:
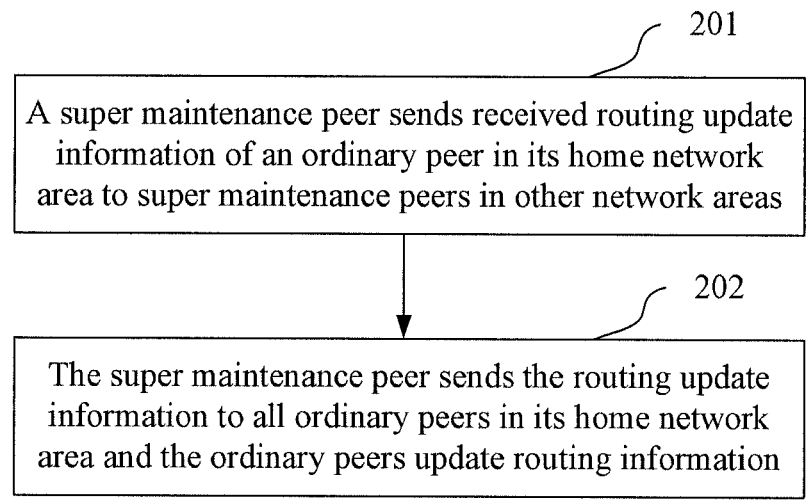
FIG. 5 is a flowchart of a method for maintaining routing information by super maintenance nodes according to an embodiment of the present invention.

FIG. 5 is a flowchart of the method for maintaining routing information by super maintenance nodes.

Step 201: A super maintenance node obtains routing update information of an ordinary node in its home network area and sends the routing update information to super maintenance nodes in other network areas according to the routing update information.

The ordinary node may send the routing update information to the super maintenance node in the local area and the super maintenance node receives the routing update information. Alternatively, the super maintenance node may obtain the routing update information from the ordinary node upon reception of a routing update notification from the ordinary node.

When it is necessary to send a message to the super maintenance node, the ordinary node obtains the address of the super maintenance node in the home area. The ordinary node may obtain the address of the super maintenance node in the home area by multiple means. The super maintenance node registers its node ID, IP address, and hierarchical relations in a DHT and the ordinary node may query the DHT to obtain information of a super maintenance node in the P2P system, including the address of the super maintenance node.

Optionally, the super maintenance node may register in a public address by another means. For example, the super maintenance node registers in a Domain Name System (DNS) or a database. The ordinary node obtains the address of the super maintenance node from the DNS or database according to the registered name.

The super maintenance node may register as an IP Anycast group member. The ordinary node initiates an Anycast request and a router returns information of the super maintenance node in its home area. Optionally, the address of the super maintenance node in the home network area may be configured manually for the ordinary node.

Step 202: A super maintenance node that receives the routing update information notifies ordinary nodes in its local network area to update routing information.

The super maintenance node may send the updated routing information to ordinary nodes in the local area. Optionally, the super maintenance node may send a routing update notification to the ordinary nodes according to the routing update information, and upon reception of the routing update notification, the ordinary nodes obtain the new routing information from the super maintenance node.

The super maintenance node may send the routing update information by means of broadcast or spread the routing update information gradually by means of parallel multicast to ordinary nodes in the home network area.

Figure 6:
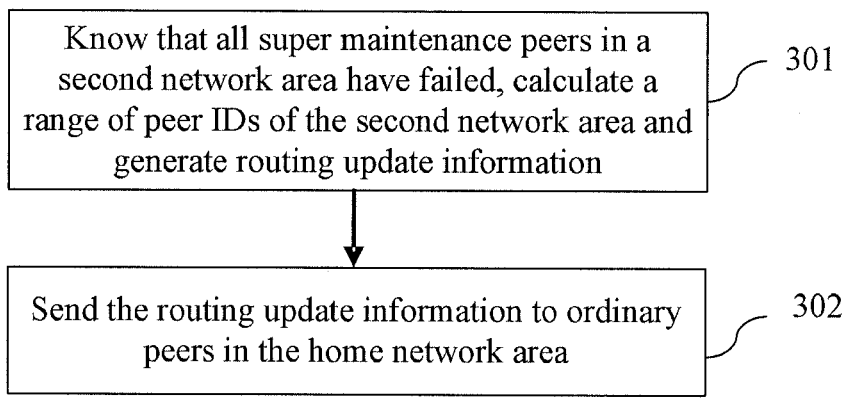
FIG. 6 is a flowchart of another method for maintaining routing information by super maintenance nodes according to an embodiment of the present invention.

FIG. 6 shows another method for maintaining routing information according to an embodiment of the present invention. The method includes:

Step 301: When a super maintenance node in a first network area knows that all super maintenance nodes in a second network area have failed, the super maintenance node in the first network area calculates the range of node IDs in the second network area and creates routing update information according to a method for constructing a node ID that carries geographic location information.

The routing update information includes the ID range of failed nodes.

Step 302: The super maintenance node in the first network area notifies ordinary nodes in its home area to update routing information.

The super maintenance node may send the updated routing information to ordinary nodes in the local area. Optionally, the super maintenance node may send a routing update notification to the ordinary nodes according to the routing update information, and upon reception of the routing update notification, the ordinary nodes obtain the new routing information from the super maintenance node.

The super maintenance node may send the routing update information by means of broadcast or spread the routing update information gradually by means of parallel multicast to ordinary nodes in the home network area.

For example, when a super maintenance node in another network area knows that all super maintenance nodes in a network area have failed, the super maintenance node may obtain the range of node IDs of the home area of the failed super maintenance nodes according to the method for constructing a node ID that carries geographic location information and send the routing information of failed nodes within the range to ordinary nodes in its home network area at a time. In this way, the maintenance overhead incurred by sending routing update information of nodes in the failed network area one by one is largely reduced.

An embodiment of the present invention provides a method for constructing node IDs that carry geographic location information. The method includes:

Step 401: Obtain geographic location information of nodes.

A node will announce its geographic location when it joins the network. Therefore, the geographic location of the node can be obtained.

Step 402: Determine the ID hash space of the node by means of striping.

Step 403: Choose a hash value from the hash space randomly and construct a node ID with the hash value while considering other attributes of the node.

The hash value chosen randomly from the hash space may be a portion of the node ID, for example, as a prefix, or a suffix, or a key field.

Figure 7:
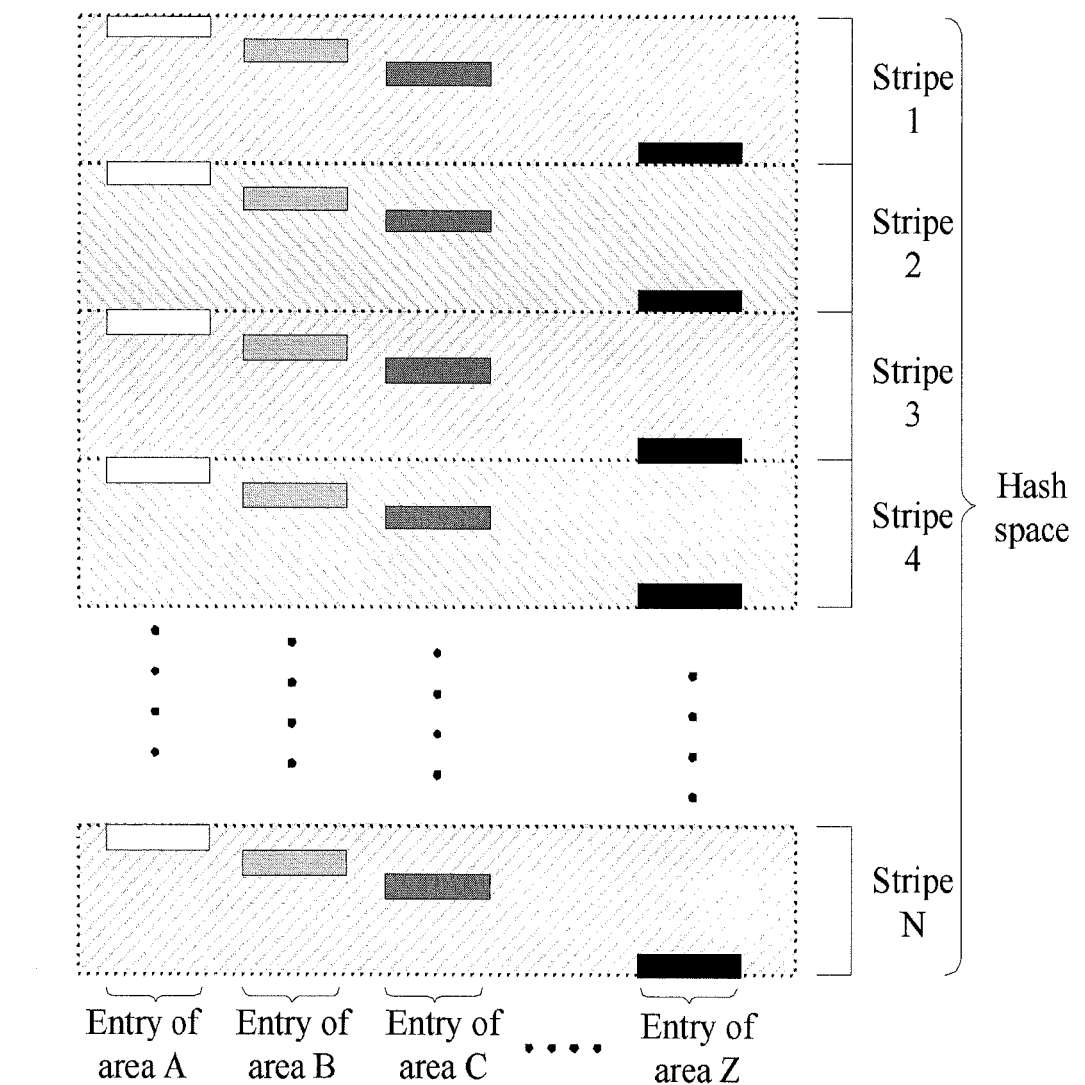
FIG. 7 illustrates a striping algorithm for network area division according to an embodiment of the present invention.

FIG. 7 shows the method for choosing a node ID by means of striping in steps 402 and 403, where each area is represented by a stripe in a different color in the figure and the entire hash space is divided into N stripes. Each stripe is further divided into m entries (the value of m is the number of areas). A node in an area chooses an entry of the area randomly as a prefix (or suffix or key field) of the node ID. The node constructs the final node ID while considering other attributes of the node. In this way, a node ID with even division of a hash space according to geographic locations is implemented so that nodes in a large area are approximately distributed to entries via striping. The larger the area is, the more widely the nodes will be distributed.

For example, according to ID setting rules, Shenzhen belongs to area B. When a node located in Shenzhen joins the network, the node will choose a stripe from the hash space randomly and find the hash range entry of area B in the stripe, and choose a hash value randomly from the hash range as a prefix (or suffix or key field) of its node ID. The node constructs the final node ID while considering other attributes of the node. With the foregoing striping scheme for ID construction, the geographic location of a node will be deduced inversely according to a key field in the node ID and a striping rule. Therefore, the location of a user is known from its node ID.

In this embodiment, the process of constructing a node ID may be completed by the node or uniformly by a central server and the node requests allocation from the central server.

Figure 8:
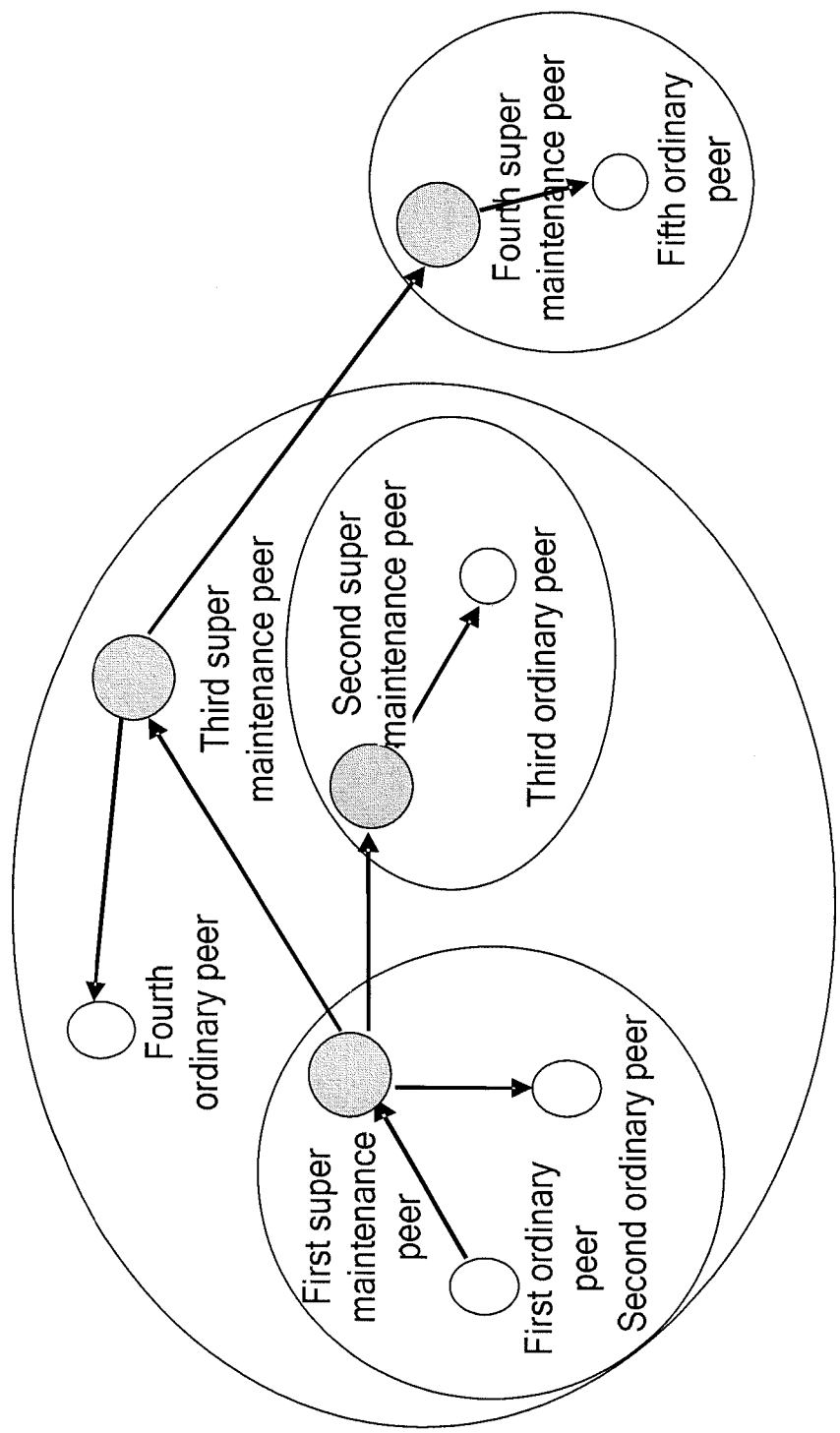
FIG. 8 illustrates a system for maintaining routing information according to an embodiment of the present invention.

According to the foregoing method for super maintenance nodes to maintain routing information, a system for maintaining routing information is provided in an embodiment of the present invention. The system is implemented on the basis of the foregoing method. A structure of the system is shown in FIG. 8, including: a first ordinary node, a first super maintenance node, a second ordinary node, a third super maintenance node, a fourth ordinary node, a fourth super maintenance node and a fifth ordinary node. The first super maintenance node is a super maintenance node in the home network area of the first ordinary node and the second ordinary node; the third super maintenance node is a super maintenance node in the home network area of the fourth ordinary node; the fourth super maintenance node is a super maintenance node in the home network area of the fifth ordinary node.

The first ordinary node generates routing update information and sends the information to the first super maintenance node.

The first super maintenance node receives the routing update information from the first ordinary node and sends routing update information to the third super maintenance node and the second ordinary node according to the routing update information.

The second ordinary node receives the routing update information from the first super maintenance node and updates routing information according to the received routing update information.

The third super maintenance node receives the routing update information from the first super maintenance node and sends routing update information to the fourth ordinary node and the fourth super maintenance node according to the routing update information.

The fourth ordinary node receives the routing update information from the third super maintenance node and updates routing information according to the received routing update information.

The fourth super maintenance node receives the routing update information from the third super maintenance node and sends routing update information to the fifth ordinary node according to the routing update information.

The fifth ordinary node receives the routing update information from the fourth super maintenance node and updates routing information according to the received routing update information.

According to the foregoing method for super maintenance nodes to maintain routing information, another system for maintaining routing information is provided in an embodiment of the present invention. The system is implemented on the basis of the foregoing method. A structure of the system is shown in FIG. 8, including: a first ordinary node, a first super maintenance node, a second ordinary node, a second super maintenance node, and a third ordinary node. The first super maintenance node is a super maintenance node in the home network area of the first ordinary node and the second ordinary node; the second super maintenance node is a super maintenance node in the home network area of the third ordinary node.

The first ordinary node generates routing update information and sends the information to the first super maintenance node.

The first super maintenance node receives the routing update information from the first ordinary node and sends routing update information to the second super maintenance node and the second ordinary node according to the routing update information.

The second ordinary node receives the routing update information from the first super maintenance node and updates routing information according to the received routing update information.

The second super maintenance node receives the routing update information from the first super maintenance node and sends routing update information to the third ordinary node according to the routing update information.

The third ordinary node receives the routing update information from the second super maintenance node and updates routing information according to the received routing update information.

According to the foregoing method for super maintenance nodes to maintain routing information, a super maintenance node is provided in an embodiment of the present invention. The super maintenance node includes:

a receiver, configured to obtain routing update information; and a transmitter, configured to receive the routing update information obtained by the receiver from the receiver, and send the routing update information to ordinary nodes in its home network area and super maintenance nodes in other network areas according to the routing update information.

The routing update information in one network area is uniformly forwarded by a super maintenance node to super maintenance nodes in other network areas or ordinary nodes in the home network area. In this way, inter-area routing update information is transferred only between super maintenance nodes so as to significantly reduce the inter-area routing table maintenance overhead incurred by the change of nodes in the P2P network.

Figure 9:
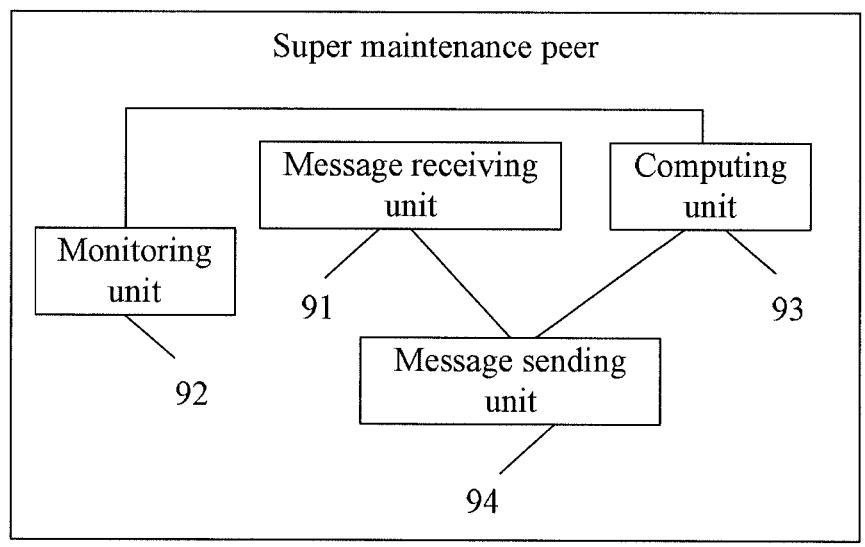
FIG. 9 illustrates a super maintenance node apparatus according to an embodiment of the present invention.

FIG. 9 shows another super maintenance node in an embodiment of the present invention. The super maintenance node includes:

a receiver 91, configured to obtain routing update information;

a monitor 92, configured to: monitor the state of telecommunication connections with other super maintenance nodes and send a route computation notification when it knows that all super maintenance nodes in a second area have failed;

a computing processor 93, configured to: receive the route computation notification from the monitor 92 and calculate the range of node IDs in the home network area of the failed super maintenance nodes according to the method for constructing a node ID that carries geographic location information, and generate routing update information; and a transmitter 94, configured to receive the routing update information obtained by the receiver 91 from the receiver 91, receive the routing update information generated by the computing processor 93 from the computing processor 93, and send routing update information to ordinary nodes in the home network area and super maintenance nodes in other network areas according to the routing update information received by the receiver 91 and the routing update information generated by the computing processor 93.

In this embodiment, a super maintenance node monitors all super maintenance nodes in other network areas. When all super maintenance nodes in another network area have failed, the super maintenance node is able to generate routing update information for the range that covers the failed node IDs and send the routing information of the failed nodes in the range to all ordinary nodes in the home network area at a time. In this way, the maintenance overhead incurred by sending routing update information of nodes in the failed network area one by one is largely reduced.

The method and apparatus for maintaining routing information in the embodiments of the present invention fully utilize nodes of strong processing capabilities at the network area border in a P2P system to enable such nodes to act as super maintenance nodes, which are responsible for notifying ordinary nodes in the home network area of received routing update information and forwarding routing update information of the home network area to super maintenance nodes in other network areas. In this way, routing update information of different network areas is only transferred between super maintenance nodes, and forwarded by the super maintenance nodes to all nodes in the network, so as to significantly reduce the inter-area routing table maintenance overhead in the P2P network incurred by the change of nodes.

According to the foregoing embodiments, those skilled in the art are clearly aware that the present invention may be implemented through hardware or through software plus a necessary universal hardware platform. Thus, the technical solution of the present invention may be made into software. The software may be stored in a non-volatile storage medium (for example, a CD-ROM, a USB disk, and a mobile hard disk), and include several notifications that instruct a computer device (such as a personal computer, a server, or a network device) to perform the methods provided in each embodiment of the present invention.

What is claimed is:

1. A method for maintaining routing information, comprising:

receiving, by a super maintenance node, routing update information of an ordinary node in a home network area of the super maintenance node from the ordinary node;

sending, by the super maintenance node, the received routing update information to super maintenance nodes in other network areas;

calculating, by the super maintenance node, a range of node IDs in a second network area and creating routing update information according to a method for constructing a node ID that carries geographic location information when the super maintenance node knows that super maintenance nodes in the second network area have failed and notifying, by the super maintenance node, ordinary nodes in the home network area of the super maintenance node of the created routing update information; and performing, by the super maintenance node, a registration including:
  registering, by the super maintenance node, node ID, IP address, and hierarchical relations, of the super maintenance node in a DHT; or
  registering, by the super maintenance node, in a public address; or
  registering, by the super maintenance node, as an IP Anycast group member.

2. The method according to the claim 1, wherein before receiving, by the super maintenance node, the routing update information of the ordinary node in the home network area of the super maintenance node from the ordinary node, the method further comprises:
  receiving, by the super maintenance node, a routing update notification from an ordinary node.

3. The method according to the claim 1, wherein the notifying, by the super maintenance node, ordinary nodes in the home network area of the super maintenance node to update routing information, further comprises:
  sending the created routing update information to the ordinary nodes in the home network area of the super maintenance node.

4. The method according to the claim 1, wherein the notifying, by the super maintenance node, ordinary nodes in the home network area of the super maintenance node to update routing information comprises:
  sending, by the super maintenance node, the updated routing information to ordinary nodes in home network area; or
  sending, by the super maintenance node, another routing update notification to the ordinary nodes according to the routing update information so that the ordinary nodes obtain the new routing information from the super maintenance node upon reception of the another routing update notification; or
  sending, by the super maintenance node, the routing update information by broadcast; or
  spreading, by the super maintenance node, the routing update information gradually by a parallel multicast to ordinary nodes in the home network area.

5. A system for maintaining routing information, comprising,
  a first ordinary node, a first super maintenance node, a second ordinary node, a third super maintenance node, a fourth ordinary node, a fourth super maintenance node and a fifth ordinary node, wherein
  the first ordinary node in a home network area of the first super maintenance node and is configured to: generate routing update information and send the routing update information to the first super maintenance node;
  the first super maintenance node is configured to: receive the routing update information from the first ordinary node and send routing update information to the third super maintenance node and to the second ordinary node in the home network area of the first super maintenance node according to the routing update information;
  the second ordinary node is configured to: receive the routing update information from the first super maintenance node and update routing information according to the received routing update information;
  the third super maintenance node is configured to: receive the routing update information from the first super maintenance node and send routing update information to the fourth ordinary node in a home network area of the third super maintenance node and to the fourth super maintenance node according to the routing update information;
  the fourth ordinary node is configured to: receive the routing update information from the third super maintenance node and update routing information according to the received routing update information;
  the fourth super maintenance node is configured to: receive the routing update information from the third super maintenance node and send routing update information to the fifth ordinary node in a home network area of the fourth super maintenance node according to the routing update information; and
  the fifth ordinary node is configured to: receive the routing update information from the fourth super maintenance node and update routing information according to the received routing update information,
  wherein one or more of the first, second or third super maintenance nodes is configured to calculate a range of node IDs in a network area and create routing update information according to a method for constructing a node ID that carries geographic location information when the first, second or third super maintenance node knows that super maintenance nodes in the network area have failed, and notify the first, second, fourth or fifth ordinary nodes in respective home network areas of the first, third and fourth super maintenance nodes of the created routing update information, and
  one or more of the first, second or third super maintenance nodes is configured to perform a registration including:
    registering node ID, IP address, and hierarchical relations, of itself in a DHT; or
    registering itself in a public address; or
    registering itself as an IP Anycast group member.

6. A system for maintaining routing information, comprising,
  a first ordinary node, a first super maintenance node, a second ordinary node, a second super maintenance node, and a third ordinary node, wherein:
  the first ordinary node in a home network area of the first super maintenance node and is configured to: generate routing update information and send the routing update information to the first super maintenance node;
  the first super maintenance node is configured to: receive the routing update information from the first ordinary node and send routing update information to the second super maintenance node and to the second ordinary node in the home network area of the first super maintenance node according to the routing update information;
  the second ordinary node is configured to: receive the routing update information from the first super maintenance node and update routing information according to the received routing update information;
  the second super maintenance node is configured to: receive the routing update information from the first super maintenance node and send routing update information to the third ordinary node in a home network area of the second super maintenance node according to the routing update information; and
  the third ordinary node is configured to: receive the routing update information from the second super maintenance node and update routing information according to the received routing update information,
    wherein one or more of the first or second super maintenance nodes is configured to calculate a range of node IDs in a network area and generate routing update information according to a method for constructing a node ID that carries geographic location information when the first or second super maintenance node knows that super maintenance nodes in the network area have failed, and notify the first, second, or third ordinary nodes in respective home network areas of the first and second super maintenance nodes of the generated routing update information, and one or more of the first or second super maintenance nodes is configured to perform a registration including:
- registering node ID, IP address, and hierarchical relations, of itself in a DHT; or
- registering itself in a public address; or
- registering itself as an IP Anycast group member.

7. A super maintenance node, comprising:
a receiver, configured to receive routing update information from an ordinary node;
a transmitter, configured to send the received routing update information to super maintenance nodes in other network areas and to notify ordinary nodes in a home network area of the super maintenance node to update routing information; and
a computing processor, configured to:
- calculate a range of node IDs in a network area and generate routing update information according to a method for constructing a node ID that carries geographic location information when the super maintenance node knows that super maintenance nodes in the network area have failed, the transmitter notifies the ordinary nodes in the home network area of the super maintenance node of the generated routing update information, and
- perform a registration including:
  - registering node ID, IP address, and hierarchical relations, of the super maintenance node in a DHT; or
  - registering the super maintenance node in a public address; or
  - registering the super maintenance node as an IP Anycast group member.

8. The super maintenance node according to the claim 7, wherein the transmitter further sends the generated routing update information to the ordinary nodes in the home network area of the super maintenance node.

9. The system according to the claim 5, the first super maintenance node is further configured to: send the created routing update information to the first and second ordinary nodes in the home network area of the first super maintenance node.

10. The system according to the claim 6, the first super maintenance node is further configured to: send the created routing update information to the first and second ordinary nodes in the home network area of the first super maintenance node.

11. A method for maintaining routing information, comprising:
sending, by an ordinary node in a home network area of a super maintenance node, routing update information of the ordinary node to the super maintenance node and
updating, by the ordinary node, routing information according to a routing update notification from the super maintenance node,
wherein:
the super maintenance node is configured to calculate a range of node IDs in a target network area and generates routing update information according to a method for constructing a node ID that carries geographic location information when the super maintenance node knows that super maintenance nodes in the target network area have failed and notify the ordinary node in the home network area of the super maintenance node to update routing information by sending the generated routing update information to the ordinary node in the home network area of the super maintenance node, and
the super maintenance node is configured to perform a registration including:
- registering node ID, IP address, and hierarchical relations, of the super maintenance node in a DHT; or
- registering the super maintenance node in a public address; or
- registering the super maintenance node as an IP Anycast group member.

12. The method according to the claim 11, wherein before the sending, by the ordinary node in the home network area of the super maintenance node, the routing update information of the ordinary node to the super maintenance node, the method further comprises:
obtaining, by the ordinary node, an address of the super maintenance node; and
sending, by the ordinary node, the routing update notification to the super maintenance node.

13. The method according to the claim 11, wherein
the ordinary node queries the DHT to obtain an address of the super maintenance node; or
the ordinary node obtains an address of the super maintenance node from the public address; or
the ordinary node initiates an Anycast request and receive an address of the super maintenance node return from a router; or
an address of the super maintenance node in the home network area is configured for the ordinary node.

14. The method according to the claim 11, further comprising:
obtaining, by the ordinary node, new routing information from the super maintenance node upon reception of another routing update notification.

* * * * *